United States Patent
Gong et al.

(10) Patent No.: US 9,385,618 B2
(45) Date of Patent: Jul. 5, 2016

(54) POWER SUPPLYING APPARATUS

(71) Applicant: SOLUM CO., LTD., Suwon (KR)

(72) Inventors: Jung Chul Gong, Suwon (KR); Jong Rok Kim, Suwon (KR); Ho Joon Jang, Suwon (KR); Hwan Cho, Suwon (KR)

(73) Assignee: SOLUM CO., LTD., Suwon (KR)

( * ) Notice: Subject to any disclaimer, the term of this patent is extended or adjusted under 35 U.S.C. 154(b) by 0 days.

(21) Appl. No.: 14/568,541

(22) Filed: Dec. 12, 2014

(65) Prior Publication Data

US 2015/0180359 A1 Jun. 25, 2015

(30) Foreign Application Priority Data

Dec. 20, 2013 (KR) ........................ 10-2013-0160330

(51) Int. Cl.
*H02M 3/335* (2006.01)

(52) U.S. Cl.
CPC ...... *H02M 3/33592* (2013.01); *H02M 3/33523* (2013.01); *H02M 3/33576* (2013.01); *Y02B 70/1475* (2013.01)

(58) Field of Classification Search
CPC ........... H02M 7/02; H02M 7/04; H02M 7/12; H02M 7/21; H02M 7/217
USPC ............... 363/20, 21.04, 21.05, 21.07, 21.08, 363/21.09, 21.1, 18, 21.12, 21.13, 21.15, 363/21.16, 21.17, 21.18
See application file for complete search history.

(56) References Cited

U.S. PATENT DOCUMENTS

| | | | |
|---|---|---|---|
| 2009/0268494 A1* | 10/2009 | Hu | .................................. 363/89 |
| 2009/0316441 A1* | 12/2009 | Hu | .............................. 363/21.06 |
| 2013/0194832 A1* | 8/2013 | Han et al. | .................... 363/21.02 |

FOREIGN PATENT DOCUMENTS

| | | |
|---|---|---|
| JP | 2013-116016 | 6/2013 |
| KR | 10-2008-0014070 | 2/2008 |
| KR | 10-2009-0014307 | 2/2009 |
| WO | WO 2006/127846 A2 | 11/2006 |
| WO | WO 2007/138537 A2 | 12/2007 |

* cited by examiner

*Primary Examiner* — Timothy J Dole
*Assistant Examiner* — Bryan R Perez (57) ABSTRACT

A power supplying apparatus may be capable of switching off a synchronous rectifier on a secondary side in advance by predicting a switching-on time on a primary side. The power supplying apparatus may include: a power converting unit switching power input to the primary side and transferring the power to the secondary side; and a synchronous rectifying unit formed on the secondary side, synchronized with the switching of the power converting unit to perform a rectification switching operation, thereby rectifying the power transferred from the power converting unit, and changing the rectification switching operation before a switching change point of the power converting unit depending on a preset timing.

10 Claims, 5 Drawing Sheets

POWER SUPPLYING APPARATUS

CROSS-REFERENCE TO RELATED APPLICATION

This application claims the benefit of Korean Patent Application No. 10-2013-0160330 filed on Dec. 20, 2013, with the Korean Intellectual Property Office, the disclosure of which is incorporated herein by reference.

BACKGROUND

The present disclosure relates to a power supplying apparatus having a synchronous rectifier on a secondary side synchronized with switching on a primary side.

Recently, various types of electronic apparatuses, such as computers, display apparatuses, various control apparatuses, and the like, have been used to meet various user demands in various locations such as in homes, offices, factories, and the like.

An internal or external power supplying apparatus for supplying required driving power may be used in electronic apparatuses in order for the electronic apparatuses to perform various operations that meet various user demands.

The power supplying apparatus may generally use a switched-mode power supply (SMPS) scheme due to such advantages as power conversion efficiency, miniaturizability, and the like.

The power supplying apparatus using the switched-mode power supply (SMPS) scheme as described above may switch power input to the primary side of a transformer, transfer the power to the secondary side of the transformer, and rectify the transferred power on the secondary side to output direct current (DC) power appropriate for use.

Therefore, generally, as in a power supplying apparatus disclosed in the Related Art below, a synchronous rectifier (SR) synchronized with switching on the primary side is used in a rectifying stage on a secondary side to significantly decrease conduction loss.

The SR should be synchronized with the switching in the primary side such that the SR is switched on at the time the primary side is switched off and the SR is switched off at the time the primary side is switched on. However, switching of the SR may be delayed, such that the synchronous rectifier may be switched on while the primary side is switched on, which may cause problems in that output power may be unstable or a dielectric breakdown of the SR or another element may occur.

RELATED ART DOCUMENT (Patent Document 1) Korean Patent Laid-Open Publication No. 10-2008-0014070

SUMMARY

An aspect of the present disclosure may provide a power supplying apparatus capable of switching off a synchronous rectifier on the secondary side of a transformer in advance by predicting a switching-on time on the primary side of the transformer.

According to an aspect of the present disclosure, a power supplying apparatus having a primary side and a secondary side electrically insulated from each other may include: a power converting unit switching power input to the primary side and transferring the power to the secondary side; and a synchronous rectifying unit formed on the secondary side, synchronized with the switching of the power converting unit to perform a rectification switching operation, thereby rectifying the power transferred from the power converting unit, and changing the rectification switching operation before a switching change point of the power converting unit depending on a preset timing.

The synchronous rectifying unit may change the rectification switching operation from switching-on to switching-off before a point at which a switching operation of the power converting unit is changed from a switched off state to a switched on state.

The synchronous rectifying unit may include: a clock generating unit generating a clock signal depending on a point at which a switching operation of the power converting unit is changed from a switched off state to a switched on state; an off time determining unit determining a switching-off time of the rectification switching operation depending on the clock signal from the clock generating unit; and a driving unit driving a switching operation of a synchronous rectifier depending on the switching-off time of the off time determining unit.

The clock generating unit may sense a voltage level of the power transferred to the secondary side to generate the clock signal depending on the point at which the switching operation of the power converting unit is changed from the switched off state to the switched on state.

The clock generating unit may include: a sensor sensing the voltage level of the power transferred to the secondary side; an RS latch performing a logic operation on a sensing result from the sensor; and a pulse generator generating a pulse signal at a rising edge point at which the switching operation of the power converting unit is changed from the switched off state to the switched on state depending on an operation result from the RS latch to output the clock signal.

The off time determining unit may include: a voltage to current converter converting a preset reference voltage into a current; a triangle wave signal generator generating a triangle wave signal by charging the current in or discharging the current from the voltage to current converter depending on the clock signal; a voltage to voltage converter converting a voltage level of the triangle wave signal from the triangle wave signal generator depending on a preset resistance ratio; a hold voltage generator generating a hold voltage based on the triangle wave signal of which the voltage level is converted by the voltage to voltage converter; and a comparator comparing the hold voltage from the hold voltage generator and the voltage level of the triangle wave signal with each other to determine the switching-off time.

The triangle wave signal generator may include: a current mirror mirroring the current from the voltage to current converter; and a charging unit charging or a discharging unit discharging the current mirrored by the current mirror in or from a capacitor to generate the triangle wave signal.

According to another aspect of the present disclosure, a power supplying apparatus having a primary side and a secondary side electrically insulated from each other may include: a power converting unit switching power input to the primary side and transferring the power to the secondary side; and a synchronous rectifying unit formed on the secondary side, sensing a switching change point of the power converting unit to perform a rectification switching operation, thereby rectifying the power transferred from the power converting unit, and compensating for a delay of the sensed switching change point to change the rectification switching operation.

The synchronous rectifying unit may compensate for a delay of a point at which a switching operation of the power converting unit is changed from a switched off state to a switched on state to change the rectification switching operation from switching-on to switching-off.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments in the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements maybe exaggerated for clarity, and the same reference numerals will be used throughout to designate the same or like elements.

Figure 1:
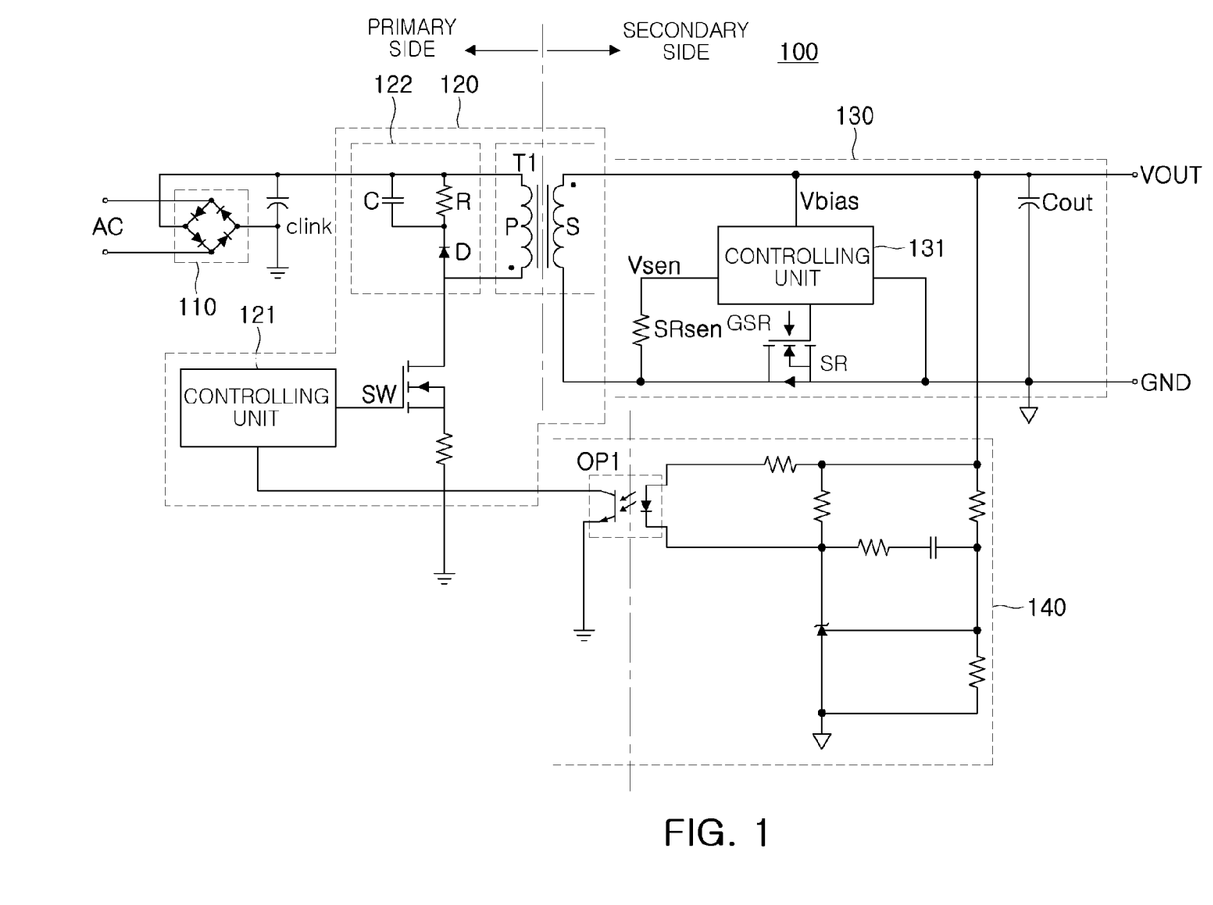
FIG. 1 is a schematic circuit diagram of a power supplying apparatus according to an exemplary embodiment in the present disclosure.

FIG. 1 is a schematic circuit diagram of a power supplying apparatus according to an exemplary embodiment in the present disclosure.

Referring to FIG. 1, a power supplying apparatus 100 according to an exemplary embodiment in the present disclosure may include a power converting unit 120 and a synchronous rectifying unit 130, and may further include a rectifying unit 110 and a feedback unit 140.

The power supplying apparatus 100 according to an exemplary embodiment in the present disclosure may have a primary side and a secondary side electrically insulated from each other, the rectifying unit 110 may be formed on the primary side, the synchronous rectifying unit 130 may be formed on the secondary side, and the power converting unit 120 and the feedback unit 140 may be formed on the primary side and the secondary side, respectively.

The rectifying unit 110 may rectify input alternating current (AC) power and transfer the rectified power to the power converting unit 120, and a link capacitor Clink may be provided in front of the power converting unit 120, stabilize the rectified power, and transfer the stabilized power to the power converting unit 120. 도 1에 Clink 표시해주세요.

The power converting unit 120 may include a pulse width modulation controlling unit 121, a snubber circuit 122, a transformer T1, and a power switch SW.

The PWM controlling unit 121 may control switching on and switching off of the power switch SW depending on feedback information from the feedback unit 140.

The snubber circuit 122 may include a capacitor C, a resistor R, and a diode D and consume surplus power generated by the switching on and switching off of the power switch SW to suppress a spike voltage generated at the time the switching is performed.

The transformer T1 may include a primary winding P formed on the primary side and a secondary winding S magnetically coupled to the primary winding P to form a preset turn ratio therebetween, varying a voltage level of power input to the primary winding P depending on the turn ratio, and transferring the power of which the voltage level is varied to the secondary side.

The power switch SW may be connected to one end of the primary winding P and may switch the power input to the primary winding P on or off depending on a control of the PWM controlling unit 121 to convert the power.

The synchronous rectifying unit 130 may rectify power from the secondary winding S, stabilize the rectified power through a capacitor Cout, and then output power VOUT.

Earlier, the synchronous rectifying unit 130 may be synchronized with the switching of the power switch SW to control switching on and switching off of a synchronous rectifier SR. To this end, a controlling unit 131 may provide a driving signal GSR synchronized with the switching of the power switch SW to the synchronous rectifier SR based on a voltage Vsen sensed by a sensing resistor SRsen. The controlling unit 131 may be operated by receiving vias power Vbias. 도 1에서, SR 및 GSR 표시해주세요.

The controlling unit 131 may control the switching on and switching off of the synchronous rectifier SR based on the voltage Vsen sensed by the sensing resistor SRsen and predict the switching on or off of the power switch SW in advance to drive the synchronous rectifier SR in advance in consideration of a driving delay time of the synchronous rectifier SR.

Figure 2:
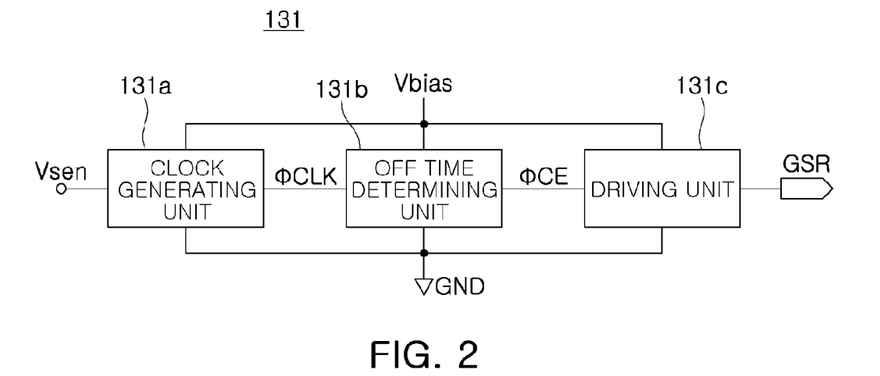
FIG. 2 is a schematic block diagram of a controlling unit used in the power supplying apparatus according to an exemplary embodiment in the present disclosure.

FIG. 2 is a schematic block diagram of a controlling unit used in the power supplying apparatus according to an exemplary embodiment in the present disclosure.

Referring to FIG. 2, the controlling unit 131 may include a clock generating unit 131a, an off time determining unit 131b, and a driving unit 131c.

The clock generating unit 131a may recognize a point at which a switching operation of the power switch SW of the power converting unit 120 is changed from a switched off state to a switched on state based on the sensed voltage Vsen obtained by sensing the power output from the secondary winding S and generate a clock signal ΦCLK depending on the change point.

The off time determining unit 131b may determine a switching-off time of a rectification switching operation of the synchronous rectifier SR depending on the clock signal ΦCLK from the clock generating unit 131a.

The driving unit 131c may provide the driving signal GSR for driving the switching operation of the synchronous rectifier depending on the switching-off time ΦCE of the off time determining unit 131b.

Figure 3:
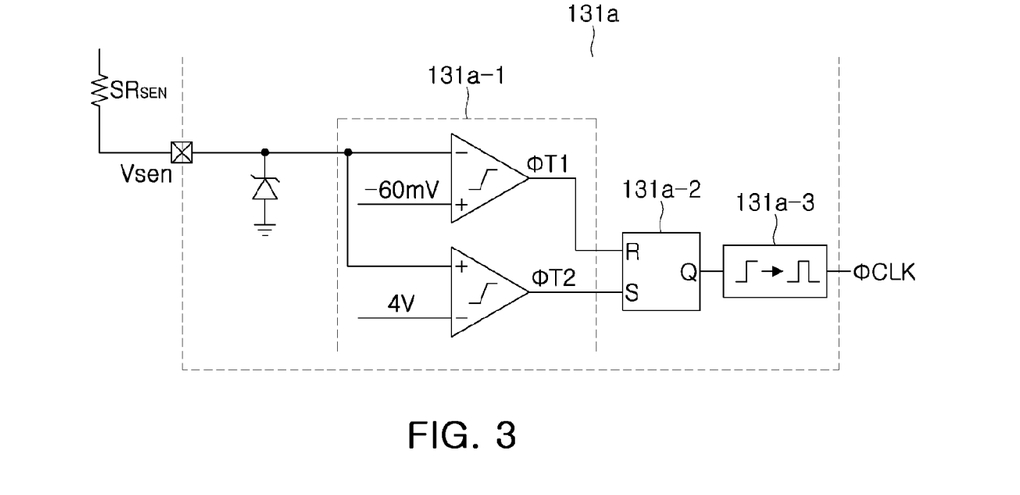
FIG. 3 is a schematic circuit diagram of a clock generating unit of the controlling unit used in the power supplying apparatus according to an exemplary embodiment in the present disclosure.
Figure 4:
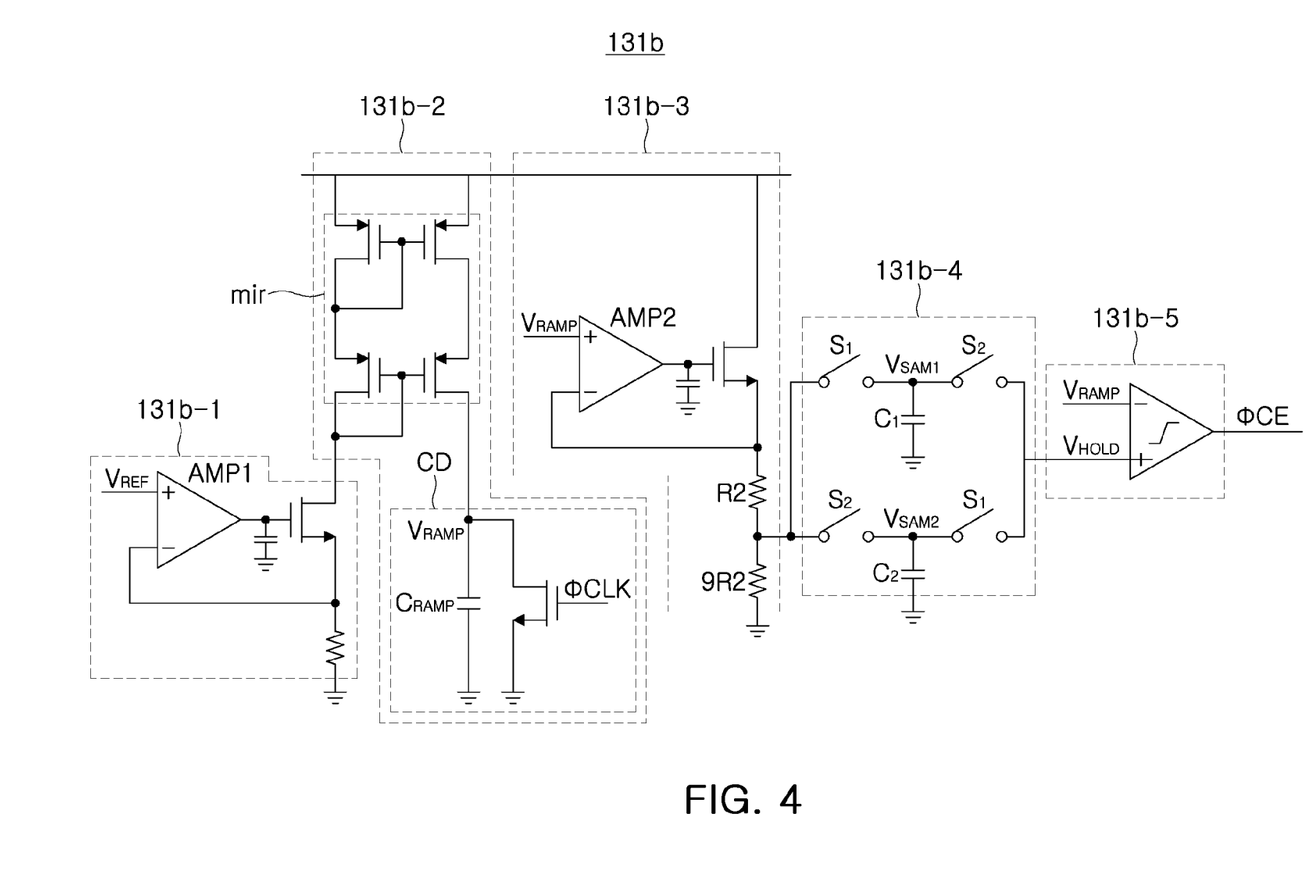
FIG. 4 is a schematic circuit diagram of an off time determining unit of the controlling unit used in the power supplying apparatus according to an exemplary embodiment in the present disclosure.
Figure 5:
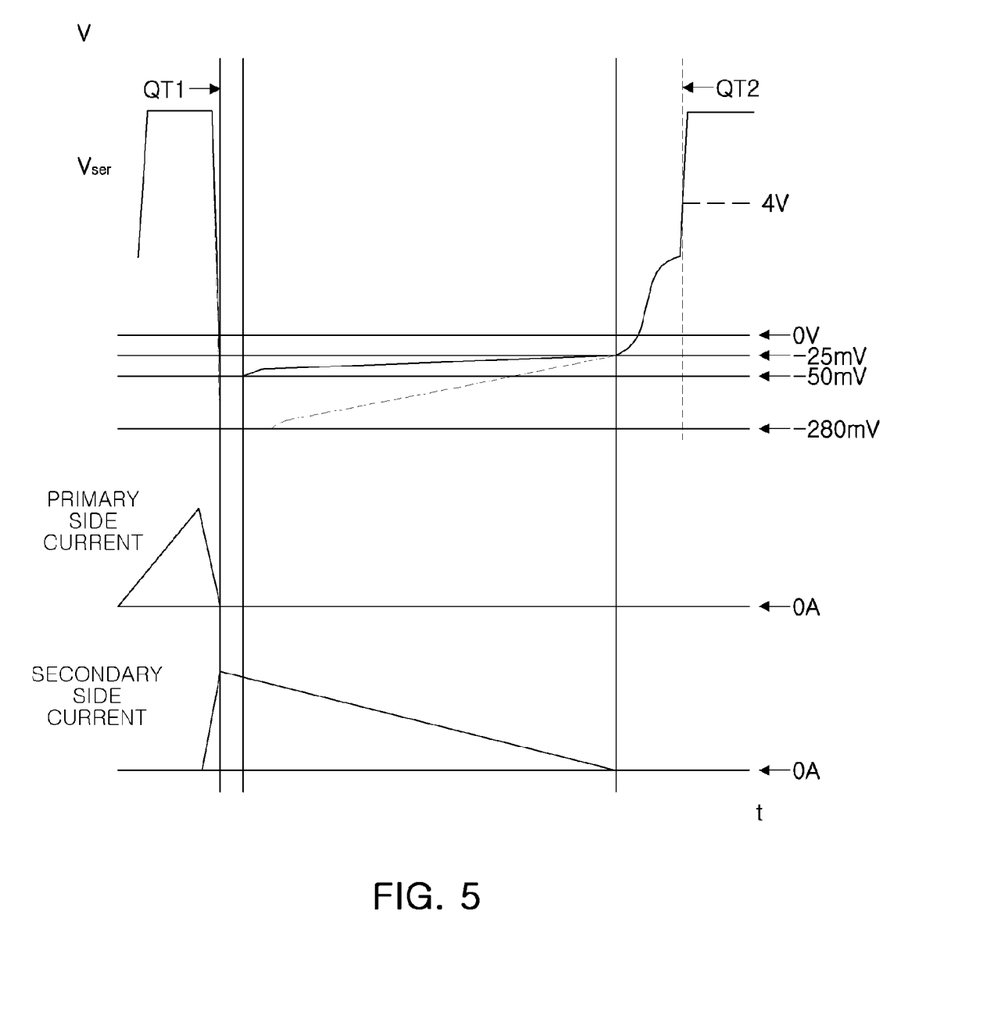
FIG. 5 is a graph illustrating voltage and current waveforms of the power supplying apparatus of an exemplary embodiment in the present disclosure.
Figure 6:
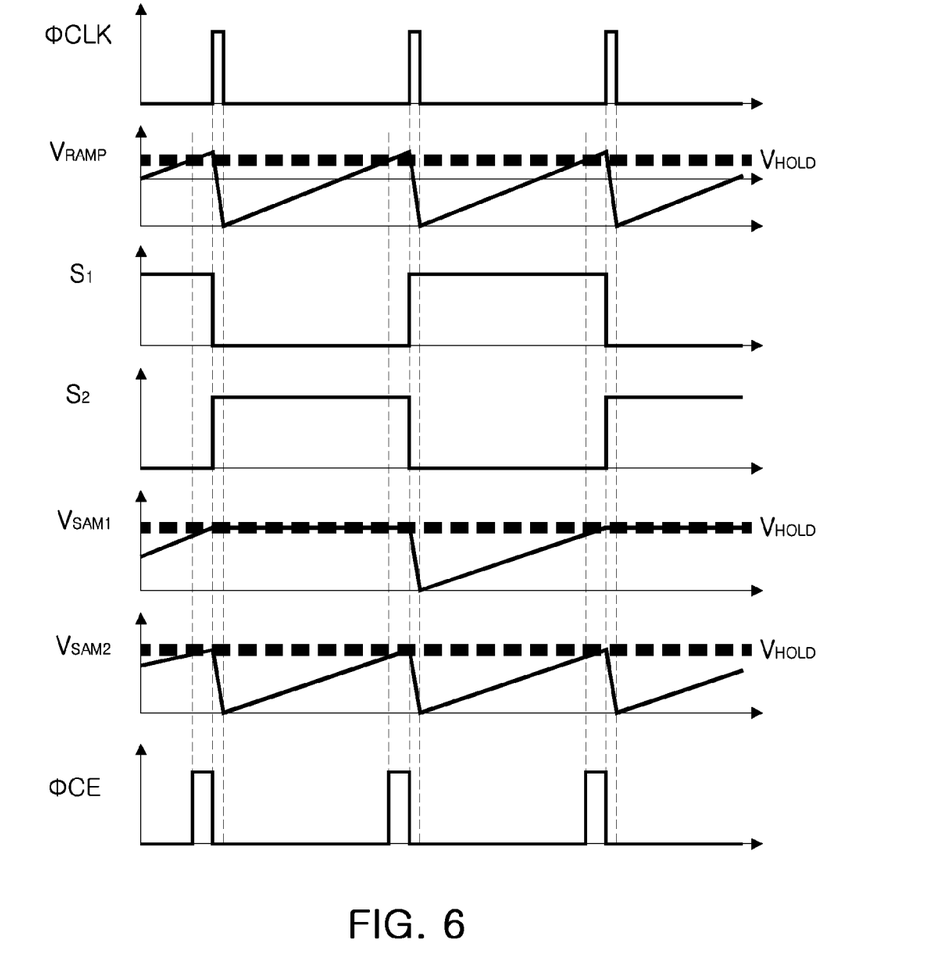
FIG. 6 is a graph illustrating signal waveforms of main components of the controlling unit used in the power supplying apparatus according to an exemplary embodiment in the present disclosure.

FIG. 3 is a schematic circuit diagram of a clock generating unit of the controlling unit used in the power supplying apparatus according to an exemplary embodiment in the present disclosure; FIG. 4 is a schematic circuit diagram of an off time determining unit of the controlling unit used in the power supplying apparatus according to an exemplary embodiment in the present disclosure; FIG. 5 is a graph illustrating voltage and current waveforms of the power supplying apparatus of an exemplary embodiment in the present disclosure; and FIG. 6 is a graph illustrating signal waveforms of main components of the controlling unit used in the power supplying apparatus according to an exemplary embodiment in the present disclosure.

Referring to FIG. 3, the clock generating unit 131a may include a sensor 131a-1, an RS latch 131a-2, and a pulse generator 131a-3.

The sensor 131a-1 may sense a voltage level of the power transferred to the secondary side.

Referring to FIG. 5, a sensed voltage Vsen obtained by sensing the power output from the secondary winding S, a primary side current, and a secondary side current are shown.

The sensed voltage Vsen may have a positive voltage level and a negative voltage level depending on the switching of the power switch SW. For example, the sensor 131a-1 may use two comparators to sense a point at which the voltage level of the sensed voltage Vsen is −60 mV and a point at which the voltage level of the sensed voltage Vsen is 4V.

Therefore, the point ΦT1 at which the voltage level of the sensed voltage Vsen is −60 mV and the point ΦT2 at which the voltage level of the sensed voltage Vsen is 4V may be a point at which the switching operation of the power switch SW is changed from the switched on state to the switched off state and a point at which the switching operation of the power switch SW is changed from the switched off state to the switched on state, respectively.

The RS latch 131a-2 may include a reset terminal R and a set terminal S receiving signals for the point ΦT1 at which the switching operation of the power switch SW is changed from the switched on state to the switched off state and the point ΦT2 at which the switching operation of the power switch SW is changed from the switched off state to the switched on state and perform a logic operation on the signals input to each terminal to output an operation result to an output terminal Q.

The pulse generator 131a-3 may output the clock signal ΦCLK based on the operation result from the RS latch 131a-2. More specifically, the pulse generator 131a-3 may generate a pulse signal at a rising edge point at which the switching operation of the power switch SW is changed from the switched off state to the switched on state to output the clock signal ΦCLK.

The clock signal ΦCLK may be provided to the off time determining unit 131b.

Referring to FIGS. 4 and 6, the off time determining unit 131b may include a voltage to current converter 131b-1, a triangle wave signal generator 131b-2, a voltage to voltage converter 131b-3, a hold voltage generator 131b-4, and a comparator 131b-5.

The voltage to current converter 131b-1 may convert a preset reference voltage Vref into a current, and the triangle wave signal generator 131b-2 may generate a triangle wave signal Vramp by charging the current in or discharging the current from the voltage to current converter 131b-1 depending on the clock signal ΦCLK.

To this end, the triangle wave signal generator 131b-2 may include a current mirror mir mirroring the current from the voltage to current converter 131b-1 and a charging unit or discharging unit CD switching power mirrored by the current mirror mir depending on the clock signal ΦCLK to charge or discharge the power in or from a capacitor Cramp, thereby generating the triangle wave signal Vramp.

The voltage to voltage converter 131b-3 may convert a voltage level of the triangle wave signal Vramp from the triangle wave signal generator 131b-2 depending on a preset resistance ratio. The resistance ratio may be set as a resistance ratio between a resistor R2 and a resistor 9R2. For example, a resistance ratio between the resistor R2 and the resistor 9R2 may be set to 1:9. Therefore, about 90% of the voltage level of the triangle wave signal Vramp may be set to a conversion voltage level. The above-mentioned resistance ratio may be set so as to be varied depending on a switching conversion delay time of the synchronous rectifier SR.

The hold voltage generator 131b-4 may charge a voltage of the triangle wave signal Vramp having the converted voltage level in capacitors $C_1$ and $C_2$ by at least four switches $S_1$ and $S_2$ switched on or switched off depending on switching control signals. The switching control signals may be generated depending on the clock signal ΦCLK. In detail, the switching control signals for controlling switching of the switches $S_1$ and $S_2$ may be generated by half dividing the clock signal ΦCLK and setting phases of the divided clock signals to be opposite to each other.

The voltage of the triangle wave signal Vramp having the converted voltage level, charged in the capacitors $C_1$ and $C_2$ may be set to a holding voltage Vhold and be provided to the comparator 131b-5.

The comparator 131b-5 may compare the triangle wave signal Vramp and the holding voltage Vhold with each other to determine a point more rapidly than the point at which the switching operation of the power switch SW is changed from the switched off state to the switched on state by about 10%, for example, in the case in which a voltage level corresponding to about 90% of the voltage level of the triangle wave signal Vramp is set to the holding voltage by the resistance ratio, and the driving unit 131c may generate the driving signal GSR based on the determined switching-off time ΦCE and control the switching of the synchronous rectifier SR to switch the synchronous rectifier SR off before the power switch SW is switched on, thereby preventing a situation in which the power switch SW and the synchronous rectifier SR are simultaneously switched on in the case of performing a power conversion operation in a continuous conduction mode (CCM). In addition, in the case of a discontinuous conduction mode (DCM), a signal at the earlier point of a point at which a negative voltage is sensed by the sensing resistor SRsen and the determined switching-off time ΦCE may be selected to switch the synchronous rectifier SR off, thereby preventing a malfunction.

As set forth above, according to exemplary embodiments in the present disclosure, a switching-on time of the primary side may be predicted to switch off the synchronous rectifier of the secondary side in advance, thereby stabilizing the output power, preventing dielectric breakdown of an element, and stabilizing the output power and increasing power conversion efficiency particularly in the continuous conduction mode (CCM) as well as the discontinuous conduction mode (DCM).

While exemplary embodiments have been shown and described above, it will be apparent to those skilled in the art that modifications and variations could be made without departing from the scope of the present invention as defined by the appended claims.

What is claimed is:

1. A power supplying apparatus having a primary side and a secondary side electrically insulated from each other, comprising:

a power converting unit switching power input to the primary side and transferring switched power to the secondary side; and a synchronous rectifying unit disposed on the secondary side, synchronized with the switching in the power converting unit to perform a rectification switching operation, thereby rectifying transferred power transferred from the power converting unit, and changing the rectification switching operation depending on a switch timing before a switching change point of the power converting unit, the synchronous rectifying unit including:

a clock generating unit generating a clock signal depending on a point at which a switching operation of the power converting unit is changed from a switched off state to a switched on state;

an off time determining unit determining a switching-off time of the rectification switching operation depending on the clock signal from the clock generating unit, the off time determining unit including:

a voltage to current converter converting a preset reference voltage into a current:

a triangle wave signal generator generating a triangle wave signal by charging the current in or discharging the current from the voltage to current converter depending on the clock signal;

a voltage to voltage converter converting a voltage level of the triangle wave signal from the triangle wave signal generator depending on a preset resistance ratio;

a hold voltage generator generating a hold voltage based on the triangle wave signal of which the voltage level is converted by the voltage to voltage converter; and a comparator comparing the hold voltage from the hold voltage generator and the voltage level of the triangle wave signal with each other to determine the switching-off time; and a driving unit driving a switching operation of a synchronous rectifier depending on the switching-off time of the off time determining unit.

2. The power supplying apparatus of claim 1, wherein the synchronous rectifying unit changes the rectification switching operation from switching-on to switching-off before a point at which a switching operation of the power converting unit is changed from a switched off state to a switched on state.

3. The power supplying apparatus of claim 1, wherein the clock generating unit senses a voltage level of the power transferred to the secondary side to generate the clock signal depending on the point at which the switching operation of the power converting unit is changed from the switched off state to the switched on state.

4. The power supplying apparatus of claim 3, wherein the clock generating unit includes:

a sensor sensing the voltage level of the power transferred to the secondary side;

an RS latch performing a logic operation on a sensing result from the sensor; and a pulse generator generating a pulse signal at a rising edge point at which the switching operation of the power converting unit is changed from the switched off state to the switched on state depending on an operation result from the RS latch to output the clock signal.

5. The power supplying apparatus of claim 1, wherein the triangle wave signal generator includes:

a current mirror mirroring the current from the voltage to current converter; and a charging unit charging or a discharging unit discharging the current mirrored by the current mirror in or from a capacitor to generate the triangle wave signal.

6. A power supplying apparatus having a primary side and a secondary side electrically insulated from each other, comprising:

a power converting unit switching power input to the primary side and transferring the power to the secondary side; and a synchronous rectifying unit formed on the secondary side, sensing a switching change point of the power converting unit to perform a rectification switching operation, thereby rectifying the power transferred from the power converting unit, and compensating for a delay of the sensed switching change point to change the rectification switching operation, the synchronous rectifying unit including:

a clock generating unit generating a clock signal depending on a point at which a switching operation of the power converting unit is changed from a switched off state to a switched on state;

an off time determining unit determining a switching-off time of the rectification switching operation depending on the clock signal from the clock generating unit, the off time determining unit including:

a voltage to current converter converting a preset reference voltage into a current:

a triangle wave signal generator generating a triangle wave signal by charging the current in or discharging the current from the voltage to current converter depending on the clock signal;

a voltage to voltage converter converting a voltage level of the triangle wave signal from the triangle wave signal generator depending on a preset resistance ratio;

a hold voltage generator generating a hold voltage based on the triangle wave signal of which the voltage level is converted by the voltage to voltage converter; and a comparator comparing the hold voltage from the hold voltage generator and the voltage level of the triangle wave signal with each other to determine the switching-off time; and a driving unit driving a switching operation of a synchronous rectifier depending on the switching-off time of the off time determining unit.

7. The power supplying apparatus of claim 6, wherein the synchronous rectifying unit compensates for a delay of a point at which a switching operation of the power converting unit is changed from a switched off state to a switched on state to change the rectification switching operation from switching-on to switching-off.

8. The power supplying apparatus of claim 6, wherein the clock generating unit senses a voltage level of the power transferred to the secondary side to generate the clock signal depending on the point at which the switching operation of the power converting unit is changed from the switched off state to the switched on state.

9. The power supplying apparatus of claim 8, wherein the clock generating unit includes:

a sensor sensing the voltage level of the power transferred to the secondary side;

an RS latch performing a logic operation on a sensing result from the sensor; and a pulse generator generating a pulse signal at a rising edge point at which the switching operation of the power converting unit is changed from the switched off state to the switched on state depending on an operation result from the RS latch to output the clock signal.

10. The power supplying apparatus of claim 6, wherein the triangle wave signal generator includes:
   a current mirror mirroring the current from the voltage to current converter; and
   a charging unit charging or a discharging unit discharging the current mirrored by the current mirror in or from a capacitor to generate the triangle wave signal.

* * * * *